Nov. 5, 1940.   G. W. EWING ET AL   2,220,323
ELLECTRICALLY OPERATED WINDOW
Filed Oct. 31, 1939   5 Sheets-Sheet 1

Inventors
George W. Ewing.
Daniel L. Chandler.
Frank H. Walker.
By James C. Hamilton
Attorney

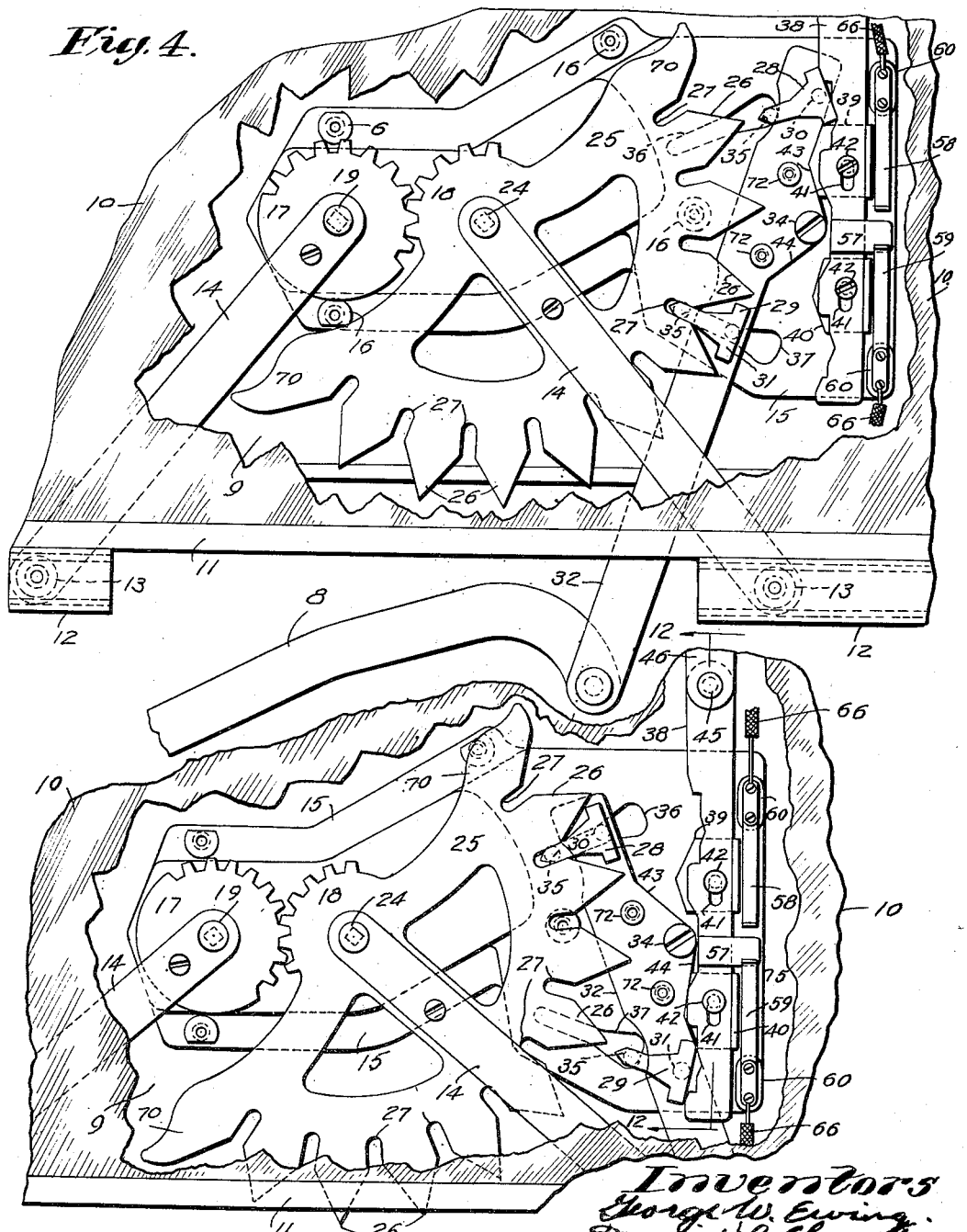

Nov. 5, 1940.  G. W. EWING ET AL  2,220,323
ELECTRICALLY OPERATED WINDOW
Filed Oct. 31, 1939  5 Sheets-Sheet 3

Inventors
George W. Ewing,
Daniel L. Chandler,
Frank H. Walker.
By James C. Hamilton
Attorney

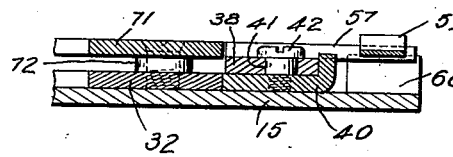
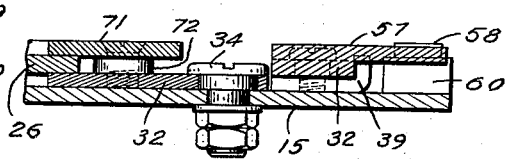
Fig. 9.  Fig. 10.
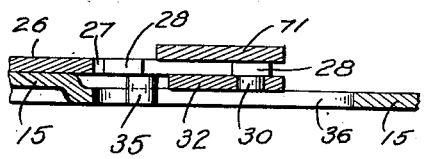
Fig. 11.
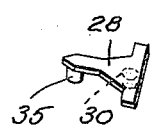
Fig. 13.
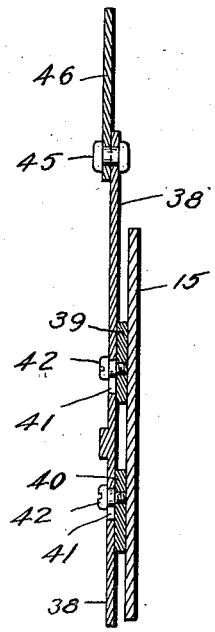
Fig. 12.
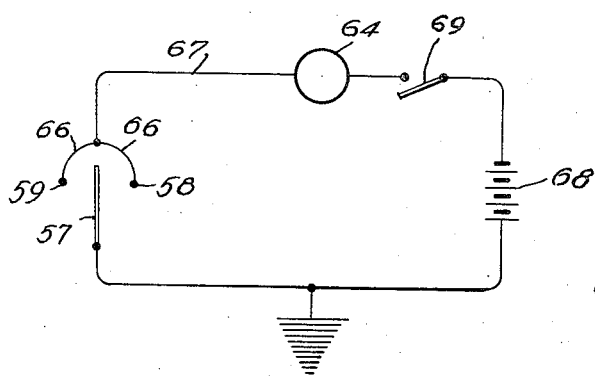
Fig. 14.

Patented Nov. 5, 1940

2,220,323

UNITED STATES PATENT OFFICE 2,220,323

ELECTRICALLY OPERATED WINDOW

George W. Ewing, Peabody, and Daniel L. Chandler and Frank H. Walker, Salem, Mass., assignors to Aresee Company Inc., Salem, Mass., a corporation of Massachusetts Application October 31, 1939, Serial No. 302,082

3 Claims. (Cl. 268—124)

Our invention relates to operating mechanism for windows especially of the type used in automobile doors and the like. More particularly, our invention, as set forth in the present application discloses a method of controlling the window pane together with apparatus to carry the method into accomplishment, and is a continuation in part of application, Window mechanism, Serial Number 294,857, filed September 14, 1939.

It is a well recognized fact in the engineering field that modern up to date equipment in all industrial lines are leaning more and more toward automatic controlled apparatus which may be operated by a simple movement of the operator's finger. This is quite apparent in the automotive field to which our present invention is particularly directed.

In the present day automobile there are very few operations which are not more or less automatic. One of these exceptions is the control of the window panes in the doors of the vehicle. Even in the highly developed mechanism of the present day automobile the passenger or operator must go through the same motions and nearly the same effort to raise or lower a window pane that he did years before when the first closed automobile started to become popular.

In our present invention we have developed a new innovation in window mechanism which is operated by an electrical motor which always runs in the same direction whether or not the window is travelling up or down, the mechanism being provided with an overriding arrangement at the top and bottom movement so that it is not necessary to stop the motor at any predetermined point thereby preventing damage to the mechanism and simplifying the electrical drive.

The principal object of our invention comprises an improved operating mechanism for windows;

Another object is the combination of an electrical drive with an automobile window raising and lowering apparatus;

And still another object is an electrically operated raising and lowering automobile window apparatus having a continuous drive in combination with an overriding reversible raising and lowering mechanism;

And a still further object is an electrically operated window mechanism which will not function when the automobile is parked, and Other objects and novel features comprising the construction and operation of our device will be apparent as the description of the same progresses.

In the drawings illustrating the preferred embodiment of our invention:

Fig. 1 is a fragmentary inside elevation of an automobile door. In this view the upholstering on the inside of the door has been cut back showing a portion thereof in the upper right-hand corner of the figure and the inside panel has also been cut back exposing the raising and lowering portion of the invention which directly connects to the said panel. The window glass being shown in the lower position and partially broken away.

Fig. 4 shows a fragmentary side elevation of the upper panel portion of the raising and lowering apparatus as viewed from the outside of the door with the outer door panel removed and the glass window pane broken out exposing the mechanism mounted on the inside panel of the door. The lower portion of the mechanism comprising the crank arm and electrical driving apparatus is not shown;

Figures 6, 7:
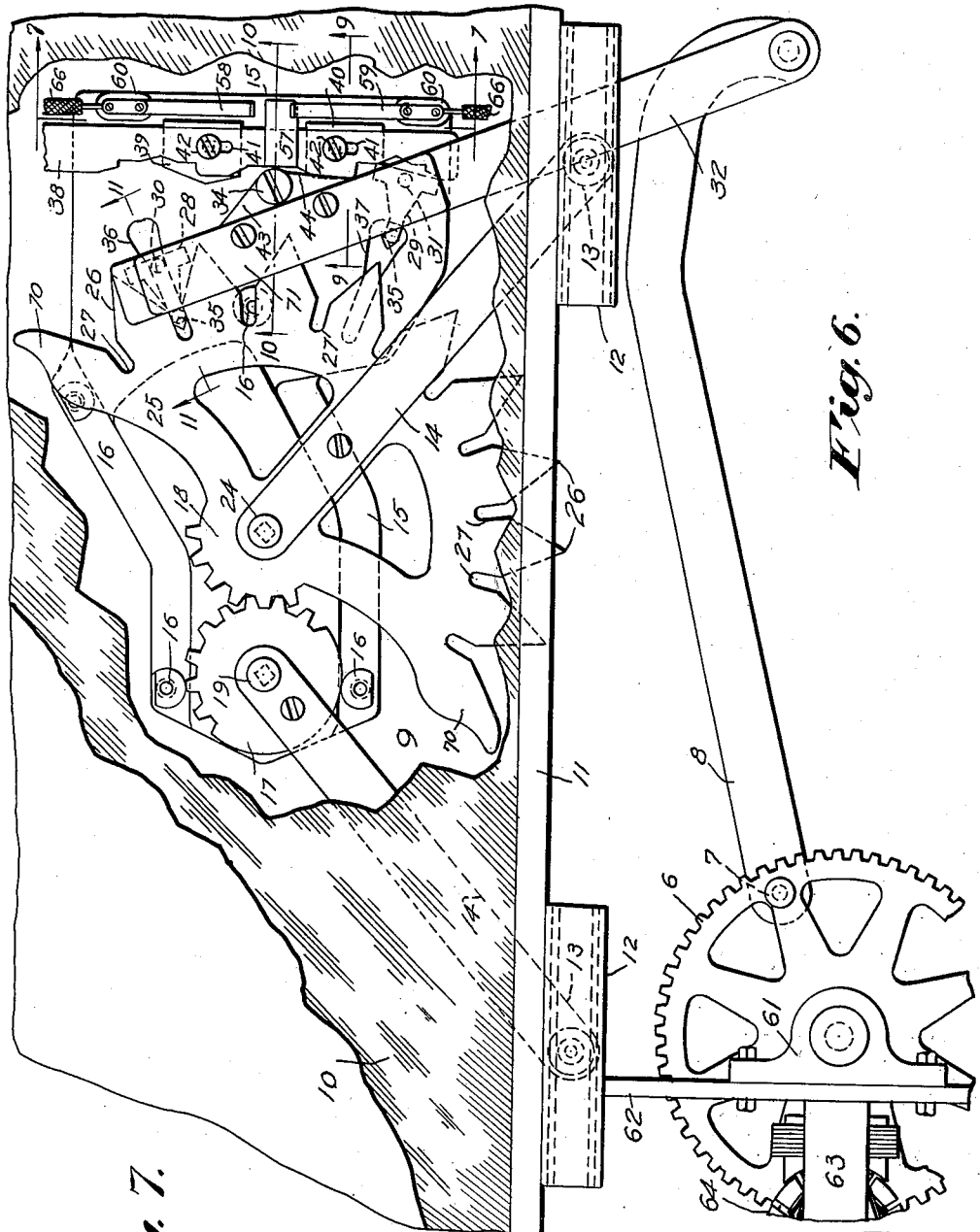
Figure 6:
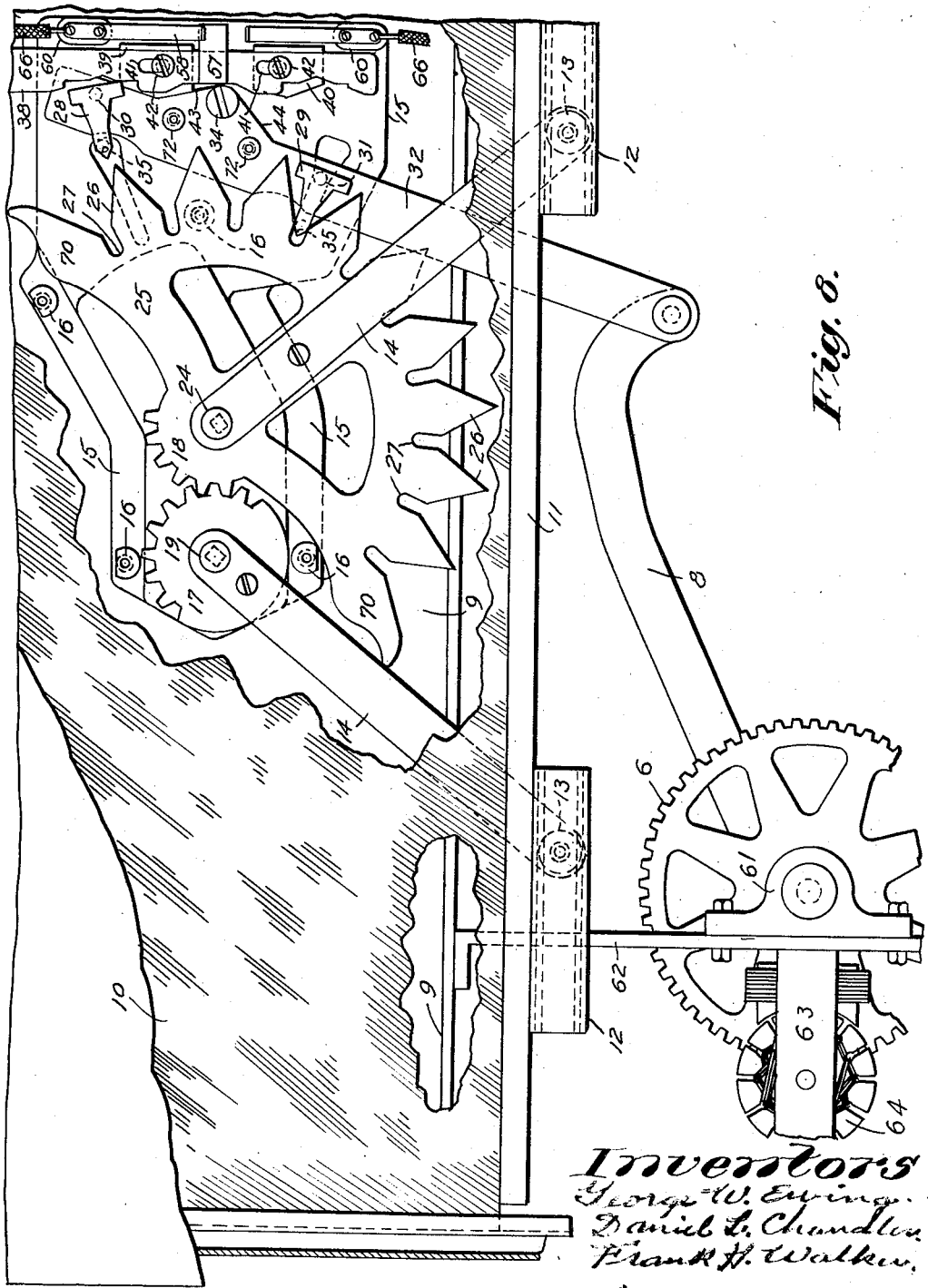

Fig. 5 is a view similar to Fig. 4 showing the position of the various parts when the operating arm is thrown to the extreme right side thereby moving the window lifting levers upwards and the V toothed gear in a counterclockwise direction. This figure shows the electrical switch which is directly connected with the reversing slide in contact with the lower electrical contact, the same position being indicated in Fig. 4;

Fig. 6 is similar to Fig. 5 being a fragmentary side elevation and showing a portion of the outside panel of the door in the upper left-hand corner and the glass window pane broken out to expose the elevating and lowering mechanism which is in a completely assembled condition. The lower left-hand portion of the figure shows the back side of the motor and electrical drive portions of which are broken away for the sake of convenience;

Fig. 7 is a detail cross-section taken on the lines 7—7 of Fig. 6 showing the electrical switch and switch contacts, the switch being engaged with the lower contact;

Fig. 8 is another fragmentary side elevation of the automobile door as viewed from the outside of the automobile. The outer panel of the door showing in the upper left-hand portion of the door has been cut away showing the glass window pane which in turn is broken out to expose the lifting and lowering mechanism. The cover plate over the actuating fingers on the operating lever has been removed to better show the position of the parts. Portions of the electrical drive have been cut away for convenience. In this view as compared with Fig. 7, the crank lever is thrown to the left and the reversing slide has been thrown to a reverse position changing the position of the upper finger on the operating lever. It will also be noted that the electrical switch is still engaged but now it is engaged with the upper contact member;

Fig. 9 is a fragmentary cross-section taken on the line 9—9 of Fig. 6;

Fig. 10 is a fragmentary cross-section taken on the line 10—10 of Fig. 6 showing the relationship between the reversing slide and the electrical switch contact member;

Fig. 11 is a fragmentary cross-section taken on the line 11—11 of Fig. 6 and showing one of the operating fingers in side elevation;

Fig. 12 is a fragmentary cross-section taken on the line 12—12 of Fig. 5 showing the mounting assembly of the reversing slide and electrical switch contact;

Fig. 13 is a perspective view of one of the fingers, and

Fig. 14 shows a simple wiring diagram of the electrical circuit as used in connection with our invention.

Referring more in detail to the drawings, 10 indicates a window pane, the lowermost edge of which is inclosed in the conventional channel member 11. On the lower edge of this channel member 11 is affixed slide-way members 12 which are provided with internal channel areas adapted to guide the special rolls 13 on the operating arms 14.

The base member 15 is secured to the inner door panel 9 or its equivalent at predetermined points, as 16. The lever arms 14 are adapted to raise the window pane 10 when the pinions 17 and 18 are rotated. The pinion 17 is journalled on the base member 15 by means of the shaft 19 which is provided with a slot 20 on the back end through which is anchored the counterbalance spring 21. The other end 22 of the spring 21 is hooked around a vertical anchor member 23 which is struck up from the plate 15. The pinion 18 is freely journalled in the plate 15 by means of the shaft 24.

On the lower side of the pinion 18 is a large segmental member 25 the outer periphery of which is provided with special teeth 26 having V shaped outer points and separated from each other by slots 27 located at the root of the teeth.

Figure 1:
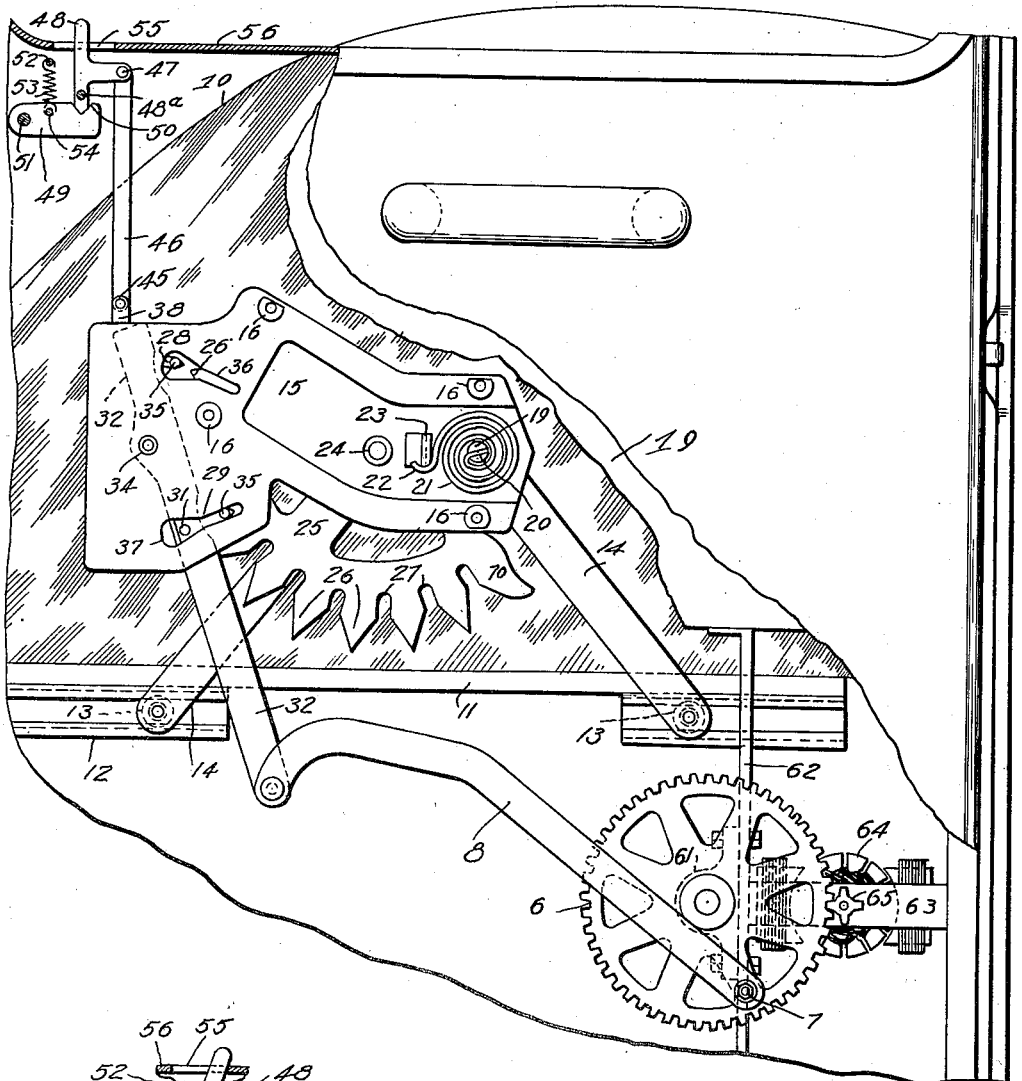

The segment 25 is rotated from left to right or right to left by means of fingers 28 and 29 which are pivoted at 30 and 31 respectively on the member 32 which comprises the operating lever of the apparatus. The lower end of the lever 32 extends below the inner door panel 9 and is pivotally connected to the crank lever 8 the opposite end of which is pivoted at 7 to the gear 6, as shown in Figs. 1, 6 and 8. The operating lever 32 is pivoted at 34 to the back plate 15. The teeth 26 on the segment member 25 are alternately engaged on the upper or lower sides in a progressive manner as the lever 32 is thrown to the right or left on the pivot member 34, the V pointed ends of the finger members 28 and 29 engaging upper or lower sides of the V shaped teeth 26 and forcing the teeth 26 up or down, as the case may be. At the end of the stroke of the lever 32 the V shaped ends of the fingers are forced into the slots 27 between the teeth 26 locking the segment 25 from further rotation either up or down.

On the under side of the fingers 28 and 29 we have provided stud pins 35 which project into the cam slots 36 and 37 provided in the base plate 15. It will be noted that the rear ends of the cam slots 36 and 37 are larger than the front ends, the side edges tapering toward each other to a point approximately on a radial line with the pointed ends of the teeth 26 on the segment member 25. From the radial line of the teeth points to the inner end of the cam slots 36 and 37 the sides of the slots are parallel and terminate approximately at the same radial point as the teeth slots 27.

When the fingers 28 and 29 are forced against the V sides of the teeth 26 by the lever 32 the V points on the teeth 28 and 29 engage one side of the V shaped teeth 26 and the pin 35 on the under side of the fingers 28 and 29 are guided in the cam slots 36 and 37 into the parallel portion the cam slots forcing the segment member 25 up or down, as the case may be. The pin 30 on the rear under side of the fingers 28 and 29 is always free to pivot in the lever 32. The rear portion of the cam slots 36 and 37 are enlarged for the purpose of allowing the fingers 28 and 29 to be swung just above or below the V points of the segment teeth 26 so that they may engage either side desired. The position either up or down of the fingers 28 and 29 are automatically positioned on their backward stroke by the position of the cam slide 38 which will now be described.

As above mentioned, the fingers 28 and 29 are tipped up or down for the purpose of engaging either the top or bottom sides of the V shaped teeth 26 by the slide 38 which is a reversing slide to change the direction of movement of the segment member 25 thereby raising or lowering the window pane. This slide 38 is mounted on the back plate 15 in the following manner. Back stop members 39 and 40 are mounted on the plate 15 the back edges of which are provided with right angle flanges against which the back edge of the reversing slide 38 bears. The broad upper side of the reversing slide 38 is provided with elongated slots 41 through which are located shouldered screws 42 threaded into the back stop members 39 and 40. These screws limit the up and down movement of the reversing slide 38. The front faces of the back stop members 39 and 40 are cut to form top and bottom angle sides against which the back edge of the operating lever 32 engages when it is thrown to its extreme limit in either direction, the stops being positioned above and below the pivot 34 of the reversing lever 32 which is provided with angle sides 43 and 44. The reversing slide is preferably composed of flat material the front edge adjacent the back portions of the fingers 28 and 29 being cut out to form recesses against which the back portions of the fingers engage when they are in their rear positions. These reversing slide recesses are so cut that they will pivot the fingers slightly up or down so that the V points of the fingers will automatically point to either one or the other sides of the V pointed teeth 26 on the segment 25, as the case may be.

In our co-pending application, the back stop members 39 and 40 are the sole limiting stops for the operating lever 32 which is hand operated. In our present application the crank lever 8 limits the movement of the operating lever 32 and the back stops 39 and 40 are used as emergency stops in case for any reason the crank lever 8 should become free thereby providing against accidental jamming of the mechanism above the drive.

The upper end of the reversing slide 38 is pivoted at 45 to the reversing slide control lever 46 the upper end of which is pivoted at 47 to a bell-crank lever 48. The bell-crank lever 48 is pivoted at 48a to a pin which is mounted on the inside of the cut-away panel 19. The lower end of the bell-crank lever 48 is V shaped and normally engages in a V shaped recess in the upper edge of a lever 49, the V recess being indicated by the numeral 50. This lever 49 is pivoted on a pin 51 which is also mounted on the inside of the panel 19. Another pin 52 is also mounted on the inside of the panel 19 over which one end of a tension spring 53 is anchored. The other end of the spring 53 is anchored to a pin 54 mounted on the far side of the lever 49. The upper end of the bell-crank lever 48 projects up through a slot 55 provided in the finish strip 56 of the window opening.

In the position of the bell-crank lever 48 shown in Fig. 1, the reversing slide 38 is in a neutral position half way between the top and bottom of the elongated slots 41 on the screws 42.

Figure 2:
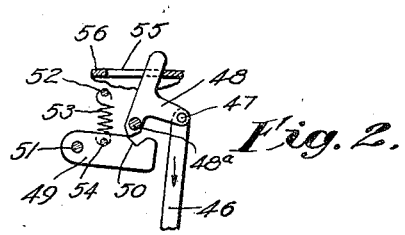
Fig. 2 is a detail elevation of the control lever shown in the upper left-hand corner of Fig. 1, the lower link being broken off. All supporting pins connecting the levers and the upper end of the spring are attached to the inside or the side remote from the observer of the door panel.

Fig. 2 shows the bell-crank lever 48 pulled to the right and the lever 46 depressed. In this position, the reversing slide 38 is pushed down into the position shown in Fig. 5 which allows the fingers 28 and 29 to pivot to their lower position so that they will engage with the lower sides of the V shaped segment teeth 26. In the position shown in Fig. 5, the finger 29 is first set in its lower position while the finger 28 remains in the segment teeth slot 27. When the operating lever 32 is thrown to the opposite side the finger 28 travels back with the lever 32 and engages in the slide recess pivoting downwardly. This movement of the operating lever 32 raises the segment a distance equal to one-half of one of the teeth 26. A reverse movement of the operating lever 32 engages the finger 28 with one of the teeth 26 on its under side again moving the segment 25 up a half a tooth. Due to the fact that the arms 14 are connected to the window pane the window pane moves upward with every movement of the segment in a counter-clockwise direction.

On the reversing slide 32 at its central portion is located an electrical contact member 57 one end of which projects toward the rear of the back plate 15. Mounted on the back plate 15 at the top and bottom of the contact member 57 are spring contact members 58 and 59. These electrical contact members 58 and 59 are mounted on the plate 15 but are insulated therefrom by the insulating blocks 60.

The gear 6 is journalled in the bearing 61 mounted on the vertical member 62, the upper end of which is anchored to the inner panel 19 and the lower end of which is anchored to the lower frame of the door, not shown. Any other means of mounting the bearing 61 securely is satisfactory. Between the vertical member 62 and one side of the door frame is located a horizontal electrical motor bracket 63 in which is journalled the armature of an electrical motor generally indicated by the numeral 64. The armature journal shaft carries a pinion 65 which is adapted to engage with the gear 6 and rotate same to actuate the crank lever 8 and thereby oscillate the operating lever 32.

Connecting the electrical spring contact members 58 and 59 are wire connectors 66 connecting with the motor 64 through the electrical conductor 67, see Fig. 14. The contact member 57 located on the reversing slide 38 is grounded to the metal frame of the vehicle to which one side of the battery 68 is connected. The other side of the battery 68 connects with the other side of the motor 64 through an ignition switch 69.

Assuming that the ignition switch is closed when the bell-crank lever is pulled to the right, as shown in Fig. 2, the lever 46 is depressed together with the reversing slide 38 and the contact member 57 is contacted with the electrical spring contact member 59. In this position of the bell-crank lever, electrical current energizes the motor 64 causing the gear 6 to rotate and the crank lever 8 oscillates the operating lever from one side to the other thereby engaging the fingers 28 and 29 alternately with the lower sides of the segment teeth 26 raising the window sash pane. As long as the bell-crank lever 48 is maintained in the right-hand position shown in Fig. 2 the window pane 10 will continue to rise until the end of travel of the segment teeth 26 is reached.

Assuming that the bell-crank lever 48 is held in its position shown in Fig. 2 after the window pane is fully raised, the motor 64, crank lever 8 and operating lever 32 will still continue to go through their various cycles but nothing will happen except that the window pane will move slightly up and down with each swing of the operating lever 32. The reason for this is due to the fact that the last tooth 70 on the segment member 25 is provided with an extra long point the inner side of which is curved outward so that the V point of the fingers 28 and 29 cannot pass to the opposite side the result of which causes the fingers 28 and 29 to ride back and forth into the same slot 27. This would go on indefinitely if the bell-crank lever 48 was maintained in the position shown in Fig. 2.

When the bell-crank lever 48 is released, the spring 53 pulls up the lever 49 causing the V point on the bell-crank lever 48 to cam back into the V recess in the side of the lever 49 thereby returning the bell-crank lever 48 to the neutral position shown in Fig. 1. When the bell-crank lever 48 assumes this neutral position, the reversing slide 38 moves up to a neutral position and the contact member attached thereto is out of contact with the spring contact member 59 but not in contact with the spring contact member 58. At this point the electrical current is broken, as shown in the wiring diagram in Fig. 14.

When the motor 64 stops it is impossible to raise or lower the window pane 10 due to the fingers 28 and 29 being in engagement in the segment teeth slots 27. Should the motor 64 stop with both of the fingers 28 and 29 out of engagement with the slots 27 and the window pane manually depressed or raised slightly, one or the other, as the case may be, of the fingers 28 or 29 will move into one of the slots 27 and no further movement of the window pane is possible without breaking some part of the mechanism.

Figure 3:
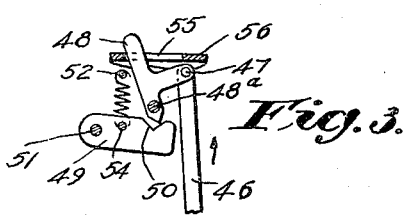
Fig. 3 is a similar detail elevation of the control lever shown in Fig. 2 except that the direction of movement of the link has been reversed.

When it is desired to lower the window pane, the bell-crank lever 48 is moved to the left as shown in Fig. 3. In this position the lever 46 and reversing slide 38 is drawn up into the position shown in Fig. 8. In this position it will be noted that the contact 57 on the reversing slide 38 is now engaging the spring contact member 58. The motor 64 is again energized rotating the gear 6, crank lever 8 and operating lever 32. On the first stroke of the lever 32 the finger 28, shown in Fig. 8, moves or pivots upward so that on the next throw of the lever 32 the V end of the finger engages on the upper side of the V shaped tooth 26 and as the lever 32 moves the finger forward the tooth 26 and segment 25 moves downward in a clock-wise direction causing the window to move downward.

In Fig. 8 the segment 25 is shown almost at the end of the downward movement. As the finger 28 moves into engagement in the slot 27 in the segment 25 the lower finger 29 moves back against the recessed portion of the reversing slide 38 and is tilted upwardly to engage the upper side of the V tooth 26 just above the finger 29, as shown in Fig. 8 and when the operating lever 32 is again reversed the finger 29 will move into the slot 27 above the one now engaged in Fig. 8. However, further movement of the operating lever 32 with the bell-crank lever set in the position shown in Fig. 3 will cause the upper finger 28 to engage against the curved end of the end tooth 70 thereby sliding into the slot 27 just below, the result being that the segment member 25 moves up slightly but not enough to bring the tooth adjacent the finger 29 by the point of the V shaped end of finger 29 so that when the lever 32 reverses again the finger 29 moves back into its previous slot 27.

When the bell-crank lever 48 is released from the position shown in Fig. 3, the lever 49 again returns it to the neutral position shown in Fig. 1 and the reversing slide 38 and attached contact member 57 moves into a neutral position between the spring contacts 58 and 59 and the motor stops.

One of the important features involved in our present invention is the overriding action in connection with the fingers 28 and 29 and the special teeth 70 located on the segment 25 which allows the motor to continue to operate after the window pane 10 has reached its upper or lower position. Because of this arrangement it is unnecessary to stop the motor 64 at exactly the right place and any further movement of the apparatus such as momentum which is present after the motor is cut out is immaterial as no damage can occur.

It should also be observed that if the bell-crank lever 48 is released at any point during the travel of the window pane 10 either up or down, the window pane becomes locked at that point and cannot be raised or lowered without energizing the motor.

To carry this point a step further we preferably connect the motor 64 on the side of the automobile ignition switch 69. In this method of electrical connection it is impossible to operate the window up or down either manually or from the bell-crank lever 48 when the ignition switch of the automobile is locked as all electrical current is then disconnected from the raising and lowering mechanism making it impossible for thieves to reach a tool over the top of a slightly lowered window.

Another important feature in connection with a motor drive to the raising and lowering mechanism is the fact that due to the overriding feature of the raising and lowering mechanism it is possible to use a continuous one direction drive. The motor always runs in one direction while the direction of the window pane 10 may be reversed instantly.

In Figs. 4, 5 and 8, the operating lever cover plate 71, shown in Fig. 6, has been removed to better illustrate the operation of the fingers 28 and 29. The plate 71 is spaced away from the operating lever 32 by means of the washers 72, the washers being slightly thicker than the fingers so that there is a slight friction between the fingers and the plate and lever. This not only keeps the fingers in the position as set by the recesses in the reversing slide 38 but also holds them in their pivots in the lever 32. Each backward movement of either finger automatically lines them up again in their proper position.

It will thus be seen that we have not only provided a very efficient and positive raising and lowering mechanism providing intermediate locking conditions throughout the travel of the window pane but also combines such a mechanism with a continuous direction electrical motor incorporating a novel means and method of operating automobile windows. While we have described the preferred mechanism and method somewhat in detail yet it is to be understood that we may vary the construction and operation within wide limits without departing from the spirit of our invention.

Having thus described our invention what we claim as new is:

1. An electrically operated automobile door window comprising in combination, a window frame having a slidable window pane mounted therein, geared mechanism connecting said window pane with said door, said geared mechanism being actuated by means of alternately actuated V toothed segment gear members connected with said window pane comprising a portion of said geared mechanism, said V toothed members being actuated by cam members, said cam members being actuated by means of an oscillating lever pivoted within said door and having one end extending down into the lower portion of said door, a unidirectional electrical motor mounted in the lower portion of said door, a reciprocating lever attached to said pivoted oscillating lever and a gear member connecting with said electrical motor, means for reversing said cam members, and means for opening and closing the electrical circuit to said electrical motor.

2. An electrically operated automobile door window comprising in combination, a window frame having a slidable window pane mounted therein, a geared mechanism connecting said window pane with said door, said geared mechanism being actuated by means of alternately actuated V toothed segment gear members connected to said window pane geared mechanism, said V toothed members being actuated by means of pivoted cam members mounted in said door, said cam members being actuated by means of an oscillating lever pivoted in said door, the lower end of said oscillating lever extending down into the lower portion of said door, a unidirectional electrical motor mounted in said door, a gear connecting with said electrical motor, a lever connecting said gear with said oscillating lever for the purpose of actuating said cam members, means connected with said cams for reversing their position with respect to engagement with said V toothed members, means for opening and closing the electrical circuit to said electrical motor.

3. An electrically operated automobile door window comprising in combination, a window frame having a slidable window pane mounted therein, a geared mechanism connecting said window pane with said door, said geared mechanism being actuated by means of a step-by-step actuated V toothed segment gear member directly connected with said window pane geared mechanism, the said V toothed segment gear member being actuated by means of pivoted cam members mounted in said door and having a cam actuating lever depending into the lower portion of said door, a unidirectional electrical motor mounted in said door, said motor being connected with said cam actuating lever by means of a reciprocating link mechanism connection between said motor and said cam actuating lever, means for actuating said motor.

GEORGE W. EWING.
DANIEL L. CHANDLER.
FRANK H. WALKER.